(12) United States Patent  (10) Patent No.: US 8,917,901 B2
Nugent et al.  (45) Date of Patent: Dec. 23, 2014

(54) METHOD AND APPARATUS FOR DETERMINING THE SURFACE PROFILE OF AN OBJECT

(75) Inventors: Keith Nugent, Victoria (AU); Brendan Edward Allman, Victoria (AU)

(73) Assignee: Iatia Imaging Pty Ltd., Victoria (AU)

( * ) Notice: Subject to any disclaimer, the term of this patent is extended or adjusted under 35 U.S.C. 154(b) by 1285 days.

(21) Appl. No.: 13/054,772

(22) PCT Filed: Jul. 17, 2008

(86) PCT No.: PCT/AU2008/001035
§ 371 (c)(1),
(2), (4) Date: May 16, 2011

(87) PCT Pub. No.: WO2009/009831
PCT Pub. Date: Jan. 22, 2009

(65) Prior Publication Data
US 2011/0229015 A1    Sep. 22, 2011

(30) Foreign Application Priority Data

Jul. 18, 2007 (AU) ................................ 2007903877

(51) Int. Cl.
*G06K 9/00* (2006.01)
*G01B 11/245* (2006.01)
(52) U.S. Cl.
CPC .................................. *G01B 11/245* (2013.01)
USPC ........................................ 382/100; 382/103
(58) Field of Classification Search
None
See application file for complete search history.

(56) References Cited

U.S. PATENT DOCUMENTS

| | | | | |
|---|---|---|---|---|
| 5,151,609 A | * | 9/1992 | Nakagawa et al. | 250/559.22 |
| 5,260,825 A | * | 11/1993 | Nagano et al. | 359/368 |
| 5,633,714 A | * | 5/1997 | Nyyssonen | 356/511 |
| 5,790,710 A | * | 8/1998 | Price et al. | 382/255 |
| 5,878,152 A | * | 3/1999 | Sussman | 382/106 |
| 6,314,212 B1 | * | 11/2001 | Womack et al. | 382/286 |
| 6,480,620 B1 | * | 11/2002 | Sakamoto | 382/154 |
| 6,885,442 B1 | * | 4/2005 | Nugent et al. | 356/121 |
| 7,619,746 B2 | * | 11/2009 | De Lega | 356/511 |
| 7,684,049 B2 | * | 3/2010 | De Groot et al. | 356/511 |
| 7,889,355 B2 | * | 2/2011 | De Lega et al. | 356/511 |
| 8,009,189 B2 | * | 8/2011 | Ortyn et al. | 348/80 |
| 8,126,677 B2 | * | 2/2012 | De Groot et al. | 702/166 |
| 8,224,064 B1 | * | 7/2012 | Hassebrook et al. | 382/154 |
| 2005/0062957 A1 | * | 3/2005 | Nugent et al. | 356/121 |
| 2007/0183647 A1 | * | 8/2007 | Allman et al. | 382/154 |
| 2008/0266574 A1 | * | 10/2008 | Groot et al. | 356/511 |

FOREIGN PATENT DOCUMENTS

| | | | | |
|---|---|---|---|---|
| DE | 102004047928 | | 4/2006 | |
| WO | WO 2005/083377 | * | 4/2003 | ................ G01J 9/00 |
| WO | 2005/083377 | | 9/2005 | |

* cited by examiner

*Primary Examiner* — Avinash J Yentrapati
(74) *Attorney, Agent, or Firm* — McDermott Will & Emery LLP

(57) ABSTRACT

The present invention relates to a method, apparatus, computer code and algorithm for determining the surface profile of an object. The invention involves capturing three or four images of the object at different planes of which some of the images can be taken outside the depth of field of the optical system and some inside the depth of the field of the optical system. The invention may have particular application in instances of surface analysis and security applications under ambient lighting conditions.

35 Claims, 9 Drawing Sheets

METHOD AND APPARATUS FOR DETERMINING THE SURFACE PROFILE OF AN OBJECT

RELATED APPLICATION

This application is a U.S. National Phase application based on International Application No. PCT/AU2008/001035, filed internationally on 17 Jul. 2008, entitled "METHOD AND APPARATUS FOR DETERMINING THE SURFACE PROFILE OF AN OBJECT", the entire disclosure of which is incorporated herein by reference.

FIELD OF THE INVENTION

This invention relates to a method and apparatus for determining the surface profile, or in other words depth of a surface from a predetermined plane, of an object.

BACKGROUND OF THE INVENTION

International patent application number PCT/AU99/00949, in respect of which the present assignee is a licensee, discloses a method and apparatus for imaging an article and in particular for determining the phase of a radiation wave field which passes through the article. This invention has particular application to providing internal structural details and thickness information relating to substantially transparent objects which cannot be easily inspected using normal intensity imaging of the object.

In order to provide the phase determination the above International application provides a solution to the transport of intensity equation.

In order to solve the above-mentioned equation images of an object are taken at different planes within the depth of field of the optics used to capture the images and that data is processed to provide the required phase information. Whilst the above International application provides extremely good results in terms of the imaging and thickness of the object it does not provide significant information relating to the surface profile of the object or, in other words, the manner in which the surface of the object changes with respect to a predetermined datum such as a plane passing through the object.

SUMMARY OF THE INVENTION

The object of the present invention is to provide a method and system for determining the surface profile of an object.

The present invention is based on the realization that the surface profile of an object can be determined by obtaining a total of three or four images from radiation reflected from the object of which some of the images of the object will be taken outside the depth of field of an optical system taking the images, and optionally one of the images may be taken inside the depth of field of the optical system. In the situation in which only three images are taken, a fourth image can be generated by processing the images taken and, in turn, determine the height distribution or surface profile of the object. Alternatively, in the situation in which a total of four different images are taken, namely three outside the depth of field and one inside the depth of field, the height distribution or surface profile can be determined without generating any further data that represents another image.

The invention may be said to reside in a method of determining the surface profile of an object comprising:

obtaining or determining three inputs that either are, or represent, three images of the object being at planes which are spaced from one another and outside the depth of field of an optical system capable of imaging the objects;

obtaining or determining one further input that is, or represents, a light distribution image of the object within the depth of field of the optical system to provide a substantially focused image of the object;

the three inputs that are, or represent, three images outside the depth of field providing height information of the surface of the object from a predetermined datum and the further input that is, or represents, the light distribution image from within the depth of field providing the light distribution from the surface of the object but no depth information; and processing the four inputs to determine a height distribution from the predetermined datum and therefore the surface profile of the object.

Throughout this specification the term "radiation" will be understood to embrace radiation of any wavelength including ambient light including visible light, non-visible light including infra light and ultra light and also other forms of radiation such as particle radiation including electrons and sound waves.

The method may involve obtaining three inputs by taking images and the fourth input is determined or generated from the three inputs. The three inputs may be images taken outside the depth of field of the imaging system. In this situation, the fourth input is representative of an image inside the depth of field of the optical system. Alternatively, two of the three inputs may be obtained by taking images outside the depth of field of the imaging system and the third input may be obtained by taking an image inside the depth of field of the imaging system. In this situation, the fourth input is generated from images taken may be representative of an image taken from inside the depth of field of the imaging system.

Three alternative embodiments of the method of the present invention will now be described in further detail.

According to one embodiment the method involves a) obtaining three images of the object by radiation reflected from the surface of the object, the three images being at planes which are spaced apart from one another and outside the depth of field of an optical system imaging the three images at the three planes; and b) generating or determining the further input by processing the three images outside the depth of the field so that the further input is in a form that represents the light distribution image.

Preferably, the processing of the three images outside the depth of field of the comprises processing data relating to the images using an optical transfer function and/or a height transfer function to determine the height distribution from the predetermined datum.

Preferably, the height transfer function is:

$$H(k_r) = -2i \int k_z \exp[-ik_z h_0] T^{(3)}(k_r, k_z) dk_z \qquad (14)$$

which is derived from the three dimensional optical transfer function which is:

$$T^{(3)}(k_r, k_z) =$$

$$\frac{1}{2\pi k_r} \left\{ \begin{array}{l} \left[ \left[\frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right| \right]^{1/2} + \\ \left[\frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right| \right]^{1/2} \end{array} \right\}$$

and wherein $k_r$ is radial lateral spatial frequency, the $k_z$ longitudinal spatial frequency and $\lambda$ is the radiation wavelength, and $\xi$ is the Numerical Aperture of the optical system. $k_{robj}$ is the maximum spatial frequency accepted by the system.

Preferably, the processing of the three images further comprises processing two of the three images and the height transfer function according to equation (14) to determine the amplitude distribution according to the following equation $$A(r) = \frac{1}{\varepsilon} \mathfrak{J}^{-1} \left\{ \frac{I_+^{(2)}(k_r) - I_-^{(2)}(k_r)}{H(k_r)} \right\} \quad (17)$$

of which $I_-$ and $I_+$ are two of the three images at planes which are spaced apart from one another outside the depth of field and being the two images which are at a distance closest to the object and a distance furthest from the object, $H(k_r)$ is the height transfer function and $\varepsilon$ is the distance of the planes at which the images $I_-$ and $I_{+o}$ are taken from the plane at which the image $I_o$ is taken.

Preferably, the height transfer function and the surface profile of the object is then solved according to $$h(r) = \frac{2}{A(r)} \mathfrak{J}^{-1} \left\{ \frac{\hat{I}_O(k_r) - \hat{A}(k_r)T^{(2)}(k_r)}{H(k_r)} \right\}. \quad (20)$$

wherein $h(r)$ is the height distribution of the surface of the object from the predetermined datum, $I_-$, $I_0$, and $I_+$ are the three images outside the depth of field, $A(r)$ is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int \exp[-ik_z h_O] T^{(3)}(k_r, k_z) dk_z \quad (18)$$

$h_0$ is the distance from the predetermined datum to the plane at which the image $I_0$ is taken, $\varepsilon$ is the distance of the planes at which the images $I_-$ and $I_+$ are taken from the plane at which the image $I_0$ is taken.

According to another embodiment, three inputs are in the form of actual images and the method involves obtaining three images by radiation reflected from the surface of the object, the three images being at planes which are spaced apart from one another and outside the depth of field of an optical system imaging the three images at the three planes.

Preferably, the further input is in the form of a light distribution image of the object and the method involves obtaining the light distribution image by light reflected from the object within the depth of field of the optical system to provide a substantially focused image of the object.

Preferably, the processing of the three inputs comprises process data relating to the images using an optical transfer function and/or a height transfer function to determine the height distribution from the predetermined datum.

Preferably, the processing of the images comprises determining the height transfer function $H(K_r)$ by processing data relating to the images using a height transfer function which can be arranged as follows $$A(r) = \frac{1}{\varepsilon} \mathfrak{J}^{-1} \left\{ \frac{I_+^{(2)}(k_r) - I_-^{(2)}(k_r)}{H(k_r)} \right\} \quad (17)$$

where $A(r)$ is the light distribution image within the depth of field, $k_r$ is the spatial frequencies (integration variables in Fourier space) in the radial direction and longitudinal direction respectively, $\varepsilon$ is the distance of the planes at which the images $I_-$ and $I_+$ are taken from the plane at which the image $I_0$ is taken.

Preferably, processing the four images to determine a height distribution and therefore the surface profile involves solving the following equation $$h(r) = \frac{2}{A(r)} \mathfrak{J}^{-1} \left\{ \frac{\hat{I}_O(k_r) - \hat{A}(k_r)T^{(2)}(k_r)}{H(k_r)} \right\}. \quad (20)$$

wherein $h(r)$ is the height distribution of the surface of the object from the predetermined datum, $I_-$, $I_0$, and $I_+$ are the three images outside the depth of field, $A(r)$ is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int \exp[-ik_z h_O] T^{(3)}(k_r, k_z) dk_z \quad (18),$$

$h_0$ is the distance from the predetermined datum to the plane at which the image $I_0$ is taken, $\varepsilon$ is the distance of the planes at which the images $I_-$ and $I_+$ are taken from the plane at which the image $I_0$ is taken.

According to another embodiment of the present invention, the method involves a) obtaining two of the three inputs in the from of actual images by radiation reflected from the surface of the object, the two images being at planes which are spaced apart from one another and outside the depth of field of an optical system imaging the two images and b) obtaining the further input in the form of a light distribution image by light reflected from the object within the depth of field of the optical system to provide a substantially focused image of the object and c) processing the two or three images to generate a third input that is a representation of the image of the object taken outside the depth of field of an optical system imaging and at a plane that is spaced from the planes of the other two images outside the depth of field.

Preferably, generating the third input is carried by either i) averaging the input of the two of the three images obtained by radiation reflected from the surface of the object at planes outside the depth of field of an optical system imaging the two images or ii) simply using one of the two images as an approximate representation of the third input image.

Preferably, the processing of the three inputs comprises process data relating to the images using an optical transfer function and/or a height transfer function to determine the height distribution from the predetermined datum.

Preferably, the processing of the images comprises determining the height transfer function $H(K_r)$ by processing data relating to the images using a height transfer function which can be arranged as follows $$A(r) = \frac{1}{\varepsilon}\mathfrak{I}^{-1}\left\{\frac{I_+^{(2)}(k_r) - I_-^{(2)}(k_r)}{H(k_r)}\right\} \quad (17)$$

where A(r) is the light distribution image within the depth of field, $k_r$ is the spatial frequencies (integration variables in Fourier space) in the radial direction and longitudinal direction respectively, $\varepsilon$ is the distance of the planes at which the images $I_-$ and $I_+$ are taken from the plane at which the image $I_0$ is taken.

Preferably, processing the four images to determine a height distribution and therefore the surface profile involves solving the following equation $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\}. \quad (20)$$

wherein h(r) is the height distribution of the surface of the object from the predetermined datum, $I_-$, $I_0$, and $I_+$ are the three images outside the depth of field, A(r) is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int \exp[-ik_z h_O] T^{(3)}(k_r, k_z) dk_z \quad (18),$$

$h_0$ is the distance from the predetermined datum to the plane at which the image $I_0$ is taken, $\varepsilon$ is the distance of the planes at which the images $I_-$ and $I_+$ are taken from the plane at which the image $I_0$ is taken.

According to yet another embodiment, the present invention involves generating an input that represents an image outside the depth of field of the optical system which is a product of the light distribution image within the depth of field and the two dimensional transfer function that is determined experimentally via a point spread function.

Preferably, experimentally determining the height transfer function involves calibrating the optical system by measuring the distance from the plane at which the image is taken and the predetermined datum by setting one of the images outside the depth of field of the optical system imaging the images as a plane of reference.

Preferably, processing the images to determine the height distribution from the predetermined datum is then the difference between the image at the plane of reference outside the depth of field and the third image generated from the in focus image once normalized by the image obtained in the depth of field of the optical system and calibrated according to the height transfer function.

Preferably, processing the four images to determine a height distribution and therefore the surface profile involves solving the following equation $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\}. \quad (20)$$

wherein h(r) is the height distribution of the surface of the object from the predetermined datum, $I_-$, $I_0$, and $I_+$ are the three images outside the depth of field, A(r) is the light distribution image within the depth of field, $k_r$ and $k_z$ are the spatial frequencies (integration variables in Fourier space) in the radial direction and longitudinal direction respectively, $h_0$ is the distance from the predetermined datum to the plane at which the image $I_0$ is taken, $\varepsilon$ is the distance of the planes at which the images $I_-$ and $I_+$ are taken from the plane at which the image $I_0$ is taken. In this embodiment, $T^{(2)}$ is the two dimensional optical transfer function formerly achieved by calculation $$T^{(2)}(k_r) = \int \exp[-ik_z h_O] T^{(3)}(k_r, k_z) dk_z \quad (18)$$

but in this embodiment achieved by experimentally measuring the optical system Point Spread Function. The Point Spread Function is the image achieved of a point of light after light form the point source has traversed the optical system.

Therefore in the determination of the height distribution of the surface of the object h(r) from the predetermined datum $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\}. \quad (20)$$

The term $$\hat{A}(k_r)T^{(2)}(k_r) \quad (21)$$

is achieved by modifying the further image with the experimental Point Spread Function to transform the further image from an in focus image to an image less in focus so as to compare with one of the images outside the depth of field of the optical system. In other words, this term is generated by blurring the image of the object obtained within the depth of field of the optical system with the Point Spread Function.

Preferably, modifying the further image involves processing the further image using a point spread function.

Calibrating the optical system may involve measuring the distance from the plane at which the image is taken and the predetermined datum by setting one of the images outside the depth of field of the optical system imaging the images as a plane of reference, and suitably the image is the nearest image to the object. Once this imaging distance has been determined the Point Spread Function can be measured for this experimental geometry and applied to the height determination $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\}. \quad (20)$$

Preferably, processing the images to determine the height distribution from the predetermined datum is then the difference between the image at the plane of reference outside the depth of field and the third image generated from the in focus image once normalized by the image obtained in the depth of field of the optical system and calibrated according to the height transfer function.

Preferably, the height transfer function is defined as equation (14) above which is derived from the three dimensional optical transfer function set out above.

This enables the height distribution and therefore the surface profile of the object to be determined according to the equation $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\}. \quad (20)$$

wherein h(r) is the height distribution of the surface of the object, $I_0$ is one of the two images outside the depth of field, A(r) is the light distribution image within the depth of field, $k_r$ is the spatial frequencies (integration variables in Fourier space) in the radial direction and longitudinal direction respectively, $T^{(2)}$ is the two dimensional optical transfer function and $A(k_r)T^{(2)}$ is the product that represents the third image outside the depth of field of the optical system.

The invention may also be said to reside in a method of determining the surface profile of an object comprising:

obtaining three images of the object by radiation reflected from the surface of the object, the three images being at planes which are spaced apart from one another and outside the depth of field of an optical system imaging the three images at the three planes;

obtaining a light distribution image of the object by light reflected from the object within the depth of field of the optical system to provide a substantially focused image of the object;

the three images outside the depth of field providing height information of the surface of the object from a predetermined datum and the light distribution image from within the depth of field providing the light distribution from the surface of the object but no depth information; and processing the four images to determine a height distribution from the predetermined datum and therefore the surface profile of the object.

In the preferred embodiment of the invention the light reflected from the object is ambient light.

Preferably the three images outside the depth of field are captured substantially concurrently.

In one embodiment the light distribution image is also captured substantially concurrently with the three images.

In another embodiment the light distribution image inside the depth of field is captured before or after the three images.

Preferably all of the images are captured by one or more CCD cameras.

In one embodiment three cameras are used to capture the images with one of the three cameras also capturing the light distribution image within the depth of field.

Preferably the method includes supplying the light to the cameras by an optical system comprising at least a lens and an iris.

In one embodiment the three images outside the depth of field of the optical system are captured using an optical system providing a high numerical aperture and low depth of field and the light distribution image within the depth of field is provided by altering the iris to provide a low numerical aperture and a high depth of field.

The Numeral Aperture of the optical system may be defined as $$\xi = \frac{NA_{condensor}}{NA_{ojective}}$$

where $NA_{condensor}$, and $NA_{objective}$ are respectively the numerical aperture of the condenser and the objective (These are settings and dimensions on a microscope).

The invention may also be said to reside in an apparatus for determining the surface profile of an object comprising:

a processor for:

i) obtaining or determining three inputs that either are, or represent, three images of the object being at planes which are spaced from one another and outside the depth of field of an optical system capable of imaging the objects;

ii) obtaining or determining one further input that is, or represents, a light distribution image of the object within the depth of field of the optical system to provide a substantially focused image of the object;

iii) the three inputs that are, or represent, three images outside the depth of field providing height information of the surface of the object from a predetermined datum and the further input that is, or represents, the light distribution image from within the depth of field providing the light distribution from the surface of the object but no depth information; and iv) processing the four inputs to determine a height distribution from the predetermined datum and therefore the surface profile of the object.

The invention may also be said to reside in an apparatus for determining the surface profile of an object comprising:

a processor for:

(a) obtaining three images of the object by radiation reflected from the surface of the object, the three images being at planes which are spaced apart from one another and outside the depth of field of an optical system imaging the three images at the three planes;

(b) obtaining a light distribution image of the object by light reflected from the object within the depth of field of the optical system to provide a substantially focused image of the object;

(c) the three images outside the depth of field providing height information of the surface of the object from a predetermined datum and the light distribution image from within the depth of field providing the light distribution from the surface of the object but no depth information; and (d) processing the four images to determine a height distribution from the predetermined datum and therefore the surface profile of the object.

Preferably the apparatus further comprises one or more CCD cameras for capturing the images.

In one embodiment three cameras are used to capture the images with one of the three cameras also capturing the light distribution image within the depth of field.

Preferably the apparatus further comprises an optical system comprising at least a lens and an iris.

Preferably the processing of the images comprises processing data relating to the images using an optical transfer function and/or a height transfer function to determine the height distribution from the predetermined datum.

Preferably the height transfer function is equation (14) which is derived from the three dimensional optical transfer function described above and which gives the two dimensional optical transfer function, equations (18) and wherein the height transfer function is solved to give the height distribution according to equation (20).

In the most preferred embodiment of the invention the processing of the four images to determine the height distribution comprises two of the three images at planes which are spaced apart from one another outside the depth of field, and being the two images which are at a distance closest to the object and a distance furthest from the object, and the light distribution image to determine the height transfer function from the equation $$A(r) = \frac{1}{\varepsilon} \Im^{-1} \left\{ \frac{I_+^{(2)}(k_r) - I_-^{(2)}(k_r)}{H(k_r)} \right\}; \qquad (17)$$

Using the three dimensional optical transfer function $T^{(3)}$ to determine the two dimensional optical transfer function $T^{(2)}$ from the following equation $$T^{(3)}(k_r, k_z) = \frac{1}{2\pi k_r} \quad (18)$$

$$\left\{ \begin{array}{l} \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right| \right]^{1/2} + \\ \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} + \frac{1}{2}k_{robj}^2(\xi^2-1)\right| \right]^{1/2} \end{array} \right\}$$

$$T^{(2)}(k_r) = \int \exp[-ik_z h_O] T^{(3)}(k_r, k_z) dk_z; \quad (19)$$

$T^{(2)}$, $h(k_r)$ and the image of the said three images taken between the image closest to the object and the image furthest from the object and the final equation $$h(r) = \frac{2}{A(r)} \Im^{-1} \left\{ \frac{\hat{I}_O(k_r) - \hat{A}(k_r) T^{(2)}(k_r)}{H(k_r)} \right\} \quad (20)$$

to determine h(r) to give the height distribution and therefore the surface profile of the object.

The invention may be said to reside in a computer program for determining the surface profile of an object using three inputs that either are, or represent, three images of the object being at planes which are spaced from one another and outside the depth of field of an optical system capable of imaging the objects and one further input that is, or represents, a light distribution image of the object within the depth of field of the optical system to provide a substantially focused image of the object, the three inputs that are, or represent, three images outside the depth of field providing height information of the surface of the object from a predetermined datum and the further input that is, or represents, the light distribution image from within the depth of field providing the light distribution from the surface of the object but no depth information, comprising:

code for processing the four inputs to determine a height distribution from the predetermined datum and therefore the surface profile of the object.

The invention may be said to reside in a computer program for determining the surface profile of an object using three images of the object obtained by radiation reflected from the surface of the object, the three images being at planes which are spaced apart from one another and outside the depth of field of an optical system imaging the, and a light distribution image of the object obtained by light reflected from the object within the depth of field of the optical system to provide a substantially focused image of the object, the three images outside the depth of field providing height information of the surface of the object from a predetermined datum and the light distribution image from within the depth of field providing the light distribution from the surface of the object but no depth information, comprising:

code for processing the four images to determine a height distribution from the predetermined datum and therefore the surface profile of the object.

Preferably the program further comprises code for processing data relating to the images using an optical transfer function and/or a height transfer function to determine the height distribution from the predetermined datum.

Preferably the height transfer function is equations (14) which is derived from the optical transfer function which is:

$$T^{(3)}(k_r, k_z) = \frac{1}{2\pi k_r} \quad (18)$$

$$\left\{ \begin{array}{l} \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right| \right]^{1/2} + \\ \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} + \frac{1}{2}k_{robj}^2(\xi^2-1)\right| \right]^{1/2} \end{array} \right\}$$

$$T^{(2)}(k_r) = \int \exp[-ik_z h_O] T^{(3)}(k_r, k_z) dk_z$$

and wherein the height transfer function is solved to give the height distribution according to equation (20).

In the most preferred embodiment of the invention the processing of the four images to determine the height distribution comprises two of the three images at planes which are spaced apart from one another outside the depth of field, and being the two images which are at a distance closest to the object and a distance furthest from the object, and the program further comprises code for using the light distribution image to determine the height transfer function from the equation (17) and using the three dimensional optical transfer function $T^{(3)}$ to determine the two dimensional optical transfer function $T^{(2)}$ from the following equation $$T^{(3)}(k_r, k_z) = \frac{1}{2\pi k_r} \quad (18)$$

$$\left\{ \begin{array}{l} \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right| \right]^{1/2} + \\ \left[ \frac{1}{2}k_{robj}^2(\xi^2+1) - \frac{1}{4}k_r^2 - \left(\frac{k_z}{\lambda k_r}\right)^2 - \left|\frac{k_z}{\lambda} + \frac{1}{2}k_{robj}^2(\xi^2-1)\right| \right]^{1/2} \end{array} \right\}$$

$$T^{(2)}(k_r) = \int \exp[-ik_z h_O] T^{(3)}(k_r, k_z) dk_z;$$

$T^{(2)}$, $h(k_r)$ and the image of the said three images taken between the image closest to the object and the image furthest from the object and the final equation (20) to determine h(r) to give the height distribution and therefore the surface profile of the object.

BRIEF DESCRIPTION OF THE DRAWINGS

Preferred embodiments of the invention will be described, by way of example, with reference to the accompanying drawings in which.

DETAILED DESCRIPTION OF THE PREFERRED EMBODIMENTS

Figure 1:
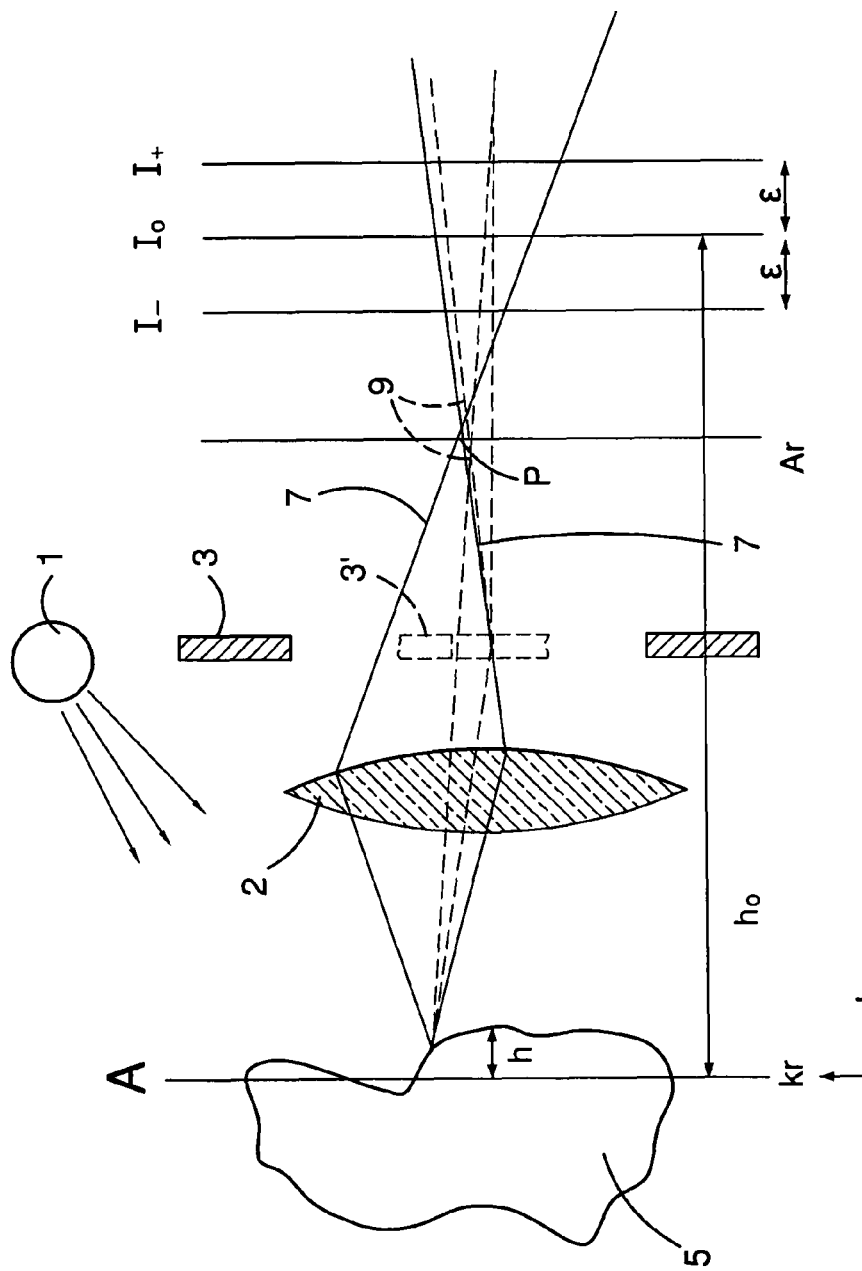
FIG. 1 is a schematic diagram illustrating the general geometry of a system embodying the invention.

With reference to FIG. 1 a schematic diagram of the geometry of the system and method is shown. Light from a light source 1 (which may simply be an ambient light source) is reflected from object 5 through a lens 2 and an iris 3. Images of the light reflected from the object 5 are captured at planes I_, I_0 and I_+. As shown the planes I_ and I_+ are separated from the plane $I_0$ by distance $\epsilon$. The three planes $I_-$, $I_0$ and $I_+$ are outside the depth of field of the optical system formed by lens 2 and iris 3 so that in effect blurred images of the object 5 are obtained as shown by rays 7. These images contain depth information relating to the height h of the surface of the object 5 facing the planes $I_-$, $I_0$ and $I_+$ from a predetermined datum such as plane A. The actual light distribution at the surface of the object 5 is obtained (i.e. a sharply focused image) at plane A(r) as shown by rays 9 in FIG. 1. The light distribution image at the plane A(r) therefore contains the actual light distribution from the plane A but no depth information relating to the surface profile of the object 5.

Figure 2:
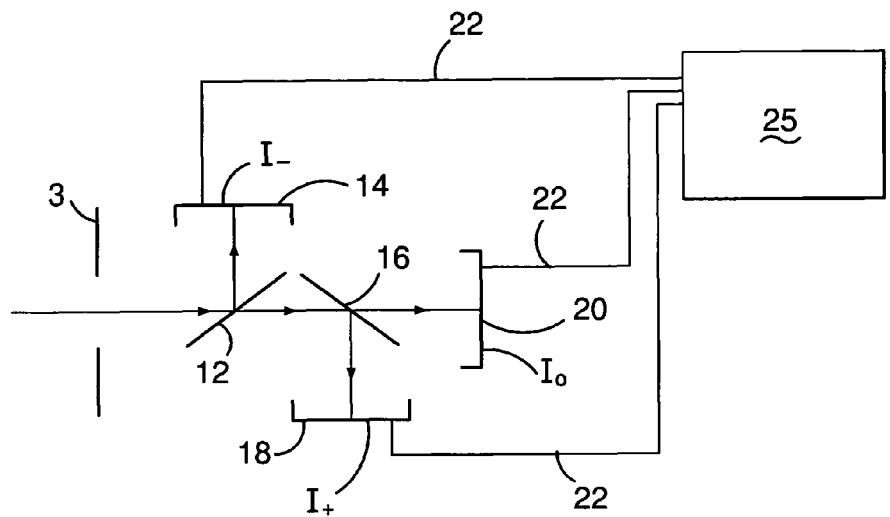
FIG. 2 is a schematic illustration of an apparatus of one embodiment of the invention.

FIG. 2 shows one embodiment of the invention in which an iris 3 allows light to pass to a beam splitter 12 so that light is reflected to a charge couple device camera 14 so an image is taken at the camera 14 which represents plane $I_-$. The beam splitter 12 enables light to pass to beam splitter 16 which directs light to charge couple device camera 18 where an image is taken representing light at the plane $I_+$. The light passes through the beam splitter to charge couple device 20 where an image is taken representing plane $I_0$. The beam splitters 12 and 16 are such that the same intensity of light is provided to each of the cameras 14, 18 and 20. In this embodiment the three images at the planes $I_-$, $I_0$ and $I_+$ are captured concurrently.

Electronic data relating to the images captured by the cameras 14, 18 and 20 is supplied by lines 22 to processor 25 where the data is processed in order to determine the height distribution h(r) of the surface of the object 5 from the plane A in FIG. 1. This therefore provides the determination of the surface profile of the object 5.

In FIG. 2 in order to provide the image of the plane A(r) the iris 3 is closed so that a sharply focused image is created at one of the cameras 14, 18 or 20 and a further image taken either before or after the three previously referred to images. Data relating to that image is also supplied to the processor 25. It should be understood that one of the cameras 14, 18 or 20 can be used to capture the in focus image because although the image actually focuses at point P in FIG. 1 as shown by the dotted lines, the focus is substantially the same at the cameras 14, 18 or 20 because of the numerical aperture provided by the iris 3'. [Iris 3' not in figure]

The embodiment of FIG. 2 therefore provides a concurrent image at the planes $I_-$, $I_0$ and $I_+$ and previously or subsequently an image at the plane A(r). By closing the iris 3 to provide the in focus image only 3 cameras are needed.

Figure 3:
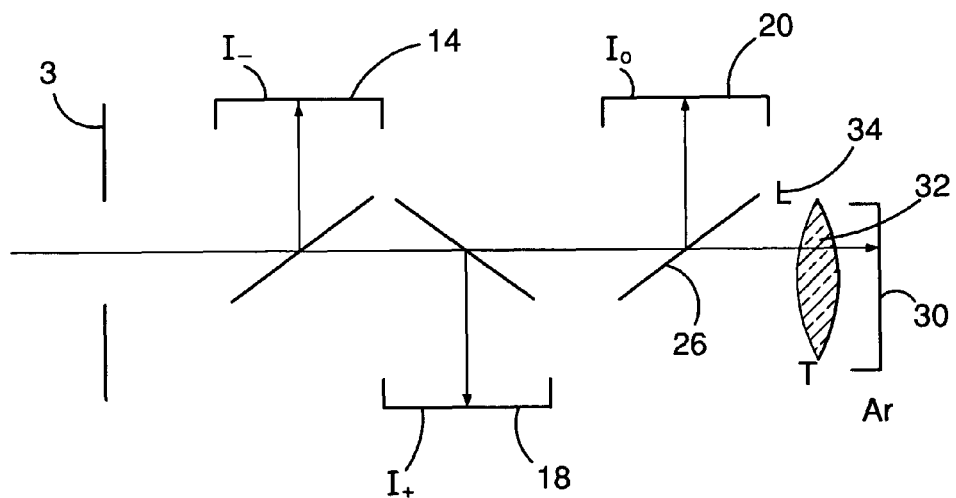
FIG. 3 is a schematic illustration of an apparatus of a second embodiment of the invention.

In the embodiment of FIG. 3 the position of the camera 20 is moved and a further beam splitter 26 is provided for directing the light to the camera 20 and also allowing light to pass to a fourth camera 30 which represents the plane Ar. Thus, in this embodiment the four images can be concurrently captured. A lens 32 and iris 34 is provided between the beam splitter 26 and the camera 30 for sharply focusing the image from the object 5 at the camera 30. The image captured by the other cameras 14, 18 and 20 is a blurred image taken outside the depth of field of the optics as in the earlier embodiment.

The manner in which the data relating to the images is processed and in theory enabling that process is described below.

A diffusively illuminated object 5 with a spatially varying height profile h(r) may be described by $$O(r,z)=A(r)\delta(z-h(r)) \tag{1}$$

where r is position in the lateral plane, z is position along the optical axis, A(r) is the amplitude distribution of the scattering function and h(r) is the height distribution to be determined.

We suppose that we obtain three images, $I_-(r)$, $I_0(r)$, $I_+(r)$, with the central image, $I_0(r)$ being defocused some distance $h_0$ from the average sample surface and the other two images being focused a small distance $\epsilon$ either side.

We use the theory of three-dimensional imaging, which assumes a paraxial telecentric system. This means that the three-dimensional Fourier transform of the image intensity can be described by $$\hat{I}^3(k_r,k_z)=\hat{O}(k_r,k_z)T^3(k_r,k_z) \tag{2}$$

where $\hat{A}$(or $\hat{O}$ are interchangeable) indicated the Fourier transform of A, and $T^3$ is the three-dimensional optical transfer function. $k_r$ and $k_z$ are the spatial frequencies (integration variables in Fourier space) in the radial direction and longitudinal direction as shown in FIG. 1 respectively. In this formalism, the two dimensional measurement is acquired via $$\hat{I}^2(k_r)=\int \hat{I}^3(k_r,k_z)dk_z \tag{3}$$

We model the effect of a small defocus by moving the sample, rather than the image plane, and we assume that there is a fixed defocus so that we effectively image three objects $$O_0(r,z)=A(r)\delta(z-h(r)-h_0) \tag{4}$$

$$O_\pm(r,z)=A(r)\delta(z-h(r)-(h_0\pm\epsilon)) \tag{5}$$

The Fourier transform of these is given by $$\hat{O}_\pm(r,z)=\int A(r)\delta(z-h(r)-(h_0\pm\epsilon))\exp[-(ik_r\cdot r+k_z z)]drdz \tag{6}$$

The integral over z is easily evaluated $$\hat{O}_\pm(r,z)=\int A(r)\exp[-i(k_r\cdot r+k_z(h(r)+(h_0\pm\epsilon)))]dr \tag{7}$$

we assume that the height variations and additional defocus are small so that $$\exp[-i(k_r\cdot r-k_z(h(r)+(h_0\pm\epsilon)))]\approx\exp[-i(k_r\cdot r+k_z h_0)](1-ik_z[h(r)\pm\epsilon]) \tag{8}$$

so the Fourier transform of the object can be written $$\hat{O}_\pm(r,z)=\exp[-ik_z h_0]\int(1\mp ik_z\epsilon)A(r)\exp[-ik_r\cdot r]dr-ik_z\exp[-ik_z h_0]\int A(r)h(r)\exp[-ik_r\cdot r]dr \tag{9}$$

Therefore $$\hat{I}_\pm(k_r,k_z)=\exp[-ik_z h_0]T^{(3)}(k_r,k_z)(1\mp ik_z\epsilon)\hat{A}(k_r)-ik_z T^{(3)}(k_r,k_z)\exp[-ik_z h_0][\hat{A}(k_r)\otimes \hat{h}(k_r)] \tag{10a}$$

and $$\hat{I}_O(k_r,k_z)=\exp[-ik_z h_O]T^{(3)}(k_r,k_z)\hat{A}(k_r)-ik_z T^{(3)}(k_r,k_z)\exp[-ik_z h_O][\hat{A}(k_r)\otimes \hat{h}(k_r)] \tag{10b}$$

and so $$\hat{I}_\pm^{(2)}(k_r)=\hat{A}(k_r)\int\exp[-ik_z h_0]T^{(3)}(k_r,k_z)(1\mp ik_z\epsilon)dk_z-i[\hat{A}(k_r)\otimes \hat{h}(k_r)]\int k_z T^{(3)}(k_r,k_z)\exp[-ik_z h_0]dk_z \tag{11a}$$

$$\hat{I}_O^{(2)}(k_r)=\hat{A}(k_r)\int\exp[-ik_z h_O]T^{(3)}(k_r,k_z)dk_z-i[\hat{A}(k_r)\otimes \hat{h}(k_r)]\int k_z T^{(3)}(k_r,k_z)\exp[-ik_z h_O]dk_z \tag{11b}$$

which can be simplified to $$\hat{I}_\pm^{(2)}(k_r)=\hat{I}_O^{(2)}(k_r)-(\pm(i\epsilon))\hat{A}(k_r)\int k_z\exp[-ik_z h_O]T^{(3)}(k_r,k_z)dk_z \tag{12}$$

From this, we can get that $$I_+^{(2)}(k_r)-I_-^{(2)}(k_r)=-2\epsilon\hat{A}(k_r)\int ik_z\exp[-ik_z h_0]T^{(3)}(k_r,k_z)dk_z \tag{13}$$

We define a (calculable) height transfer function as $$H(k_r)=-2i\int k_z\exp[-ik_z h_0]T^{(3)}(k_r,k_z)dk_z \tag{14}$$

Note that, because of the symmetry of $T^{(3)}(k_r,k_z)$, $$H(k_r)\to 0 \text{ when } h_0\to 0. \tag{15}$$

Eq(14) then gives $$I_+^{(2)}(k_r) - I_-^{(2)}(k_r) = \epsilon \hat{A}(k_r) H(k_r) \quad (16)$$

and $$A(r) = \frac{1}{\epsilon} \mathfrak{I}^{-1} \left\{ \frac{I_+^{(2)}(k_r) - I_-^{(2)}(k_r)}{H(k_r)} \right\} \quad (17)$$

We have therefore solved for the amplitude distribution. We can take the sum of the measurements to find $$\hat{I}_O^{(2)}(k_r) = \hat{A}(k_r) \int \exp[-ik_z h_O] T^{(3)}(k_r, k_z) dk_z - i[\hat{A}(k_r) \otimes \hat{h}(k_r)][k_z T^{(3)}(k_r, k_z)] \exp[-ik_z h_O] dk_z \quad (11b)$$

from $$T^{(2)}(k_r) = \int \exp[-ik_z h_O] T^{(3)}(k_r, k_z) dk_z \quad (18)$$

which is $$\hat{I}_O^{(2)}(k_r) = \hat{A}(k_r) T^{(2)}(k_r) - \frac{1}{2} [\hat{A}(k_r) \otimes \hat{h}(k_r)] H(k_r) \quad (19)$$

and $$h(r) = \frac{2}{A(r)} \mathfrak{I}^{-1} \left\{ \frac{\hat{I}_O(k_r) - \hat{A}(k_r) T^{(2)}(k_r)}{H(k_r)} \right\}. \quad (20)$$

The above explains the theory enabling the height distribution or surface detail information to be provided. In the above theory the height transfer function h is determined from equation 14 and used to calculate A(r). In the actual method employed according to the preferred embodiment A(r) is measured and forms the in focus light distribution image referred to above and this image together with the three outer focus images is used to calculate the height transfer function H from equation 17 which is then used to determine the height distribution h(r).

The values k referred to above are in Fourier space in the value A(r) is in real space. Values such as the value I in the expression $I_+(k_r)$ is the Fourier transform of $I_+$. $T^{(3)}$ is the three dimensional optical transfer function and $T^{(2)}$ is the two dimensional optical transfer function. As is conventional the $^{(2)}$ or $^{(3)}$ represent the two dimensional or three dimensional values.

Figure 4:
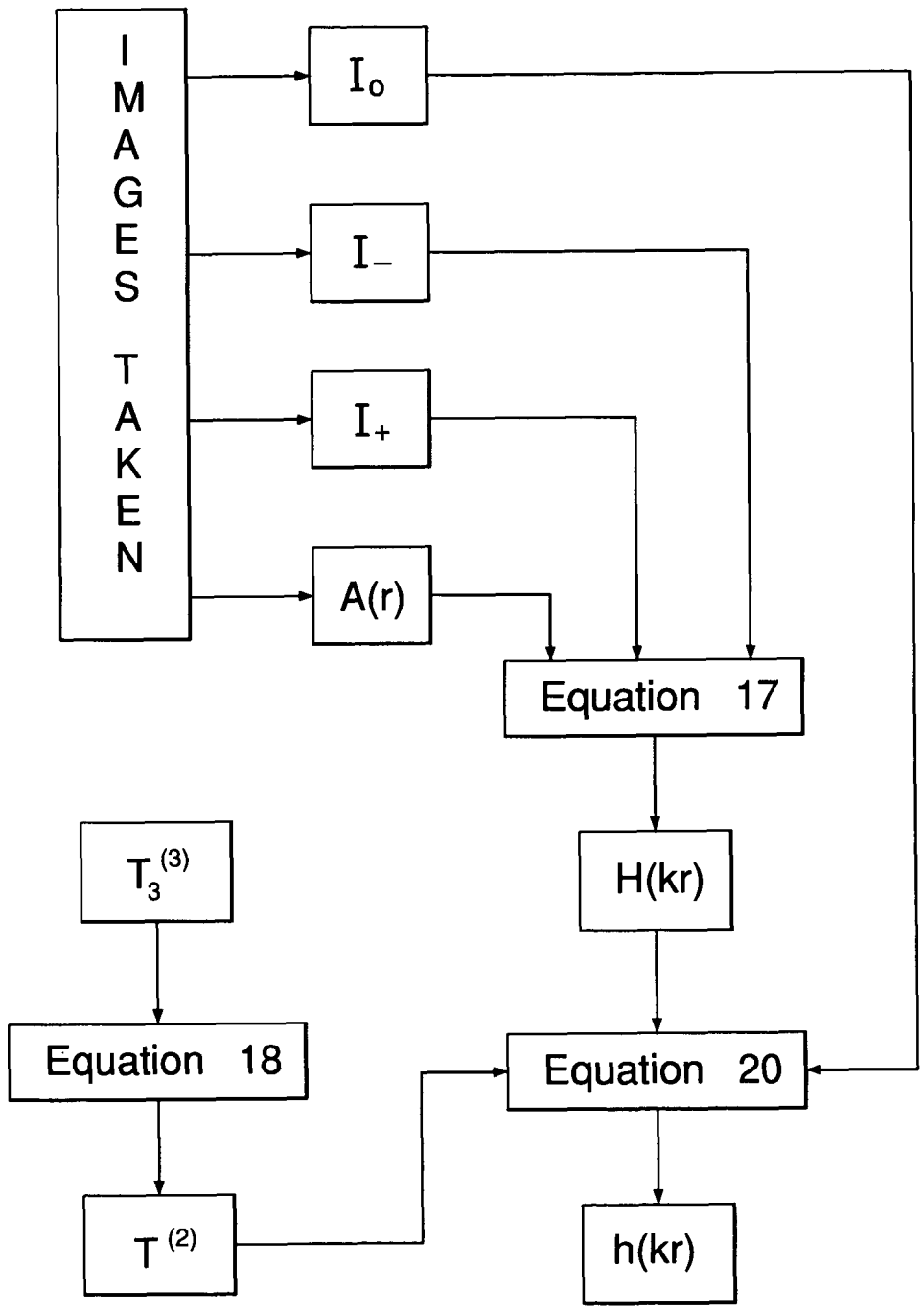
FIGS. 4 to 10 are flow charts illustrating the methodology of separate embodiments of the invention.

With reference to FIG. 4 the images $I_-$, $I_+$ and A(r) are taken using the cameras referred to above in accordance with either FIG. 2 or FIG. 3 and are stored as electronic data.

The data relating to the images $I_-$, $I_+$ and A(r) are used by the processor 25 to determine the height transfer function H using equation 17. As can be seen from equation 17 above the variables required to determine $H(k_r)$ are A(r) and the two dimensional representations of the images $I_+$ and $I_-$.

The three dimensional optical transfer function $T^{(3)}$ is a known function and is given in literature such as Journal of the Optical Society of America A/Volume 2 No. 2 Feb. 1985. The three dimensional optical transfer function is used to obtain the two dimensional optical transfer function using the equation 18 in which the variables are $h_O$ which is measured according to the setup as shown in FIG. 1 and the equation $T^{(3)}$ and is effectively the integral of the equation $T^{(3)}$.

Equation 20 is then used to determine h(r) with the inputs being $T^{(2)}$, H and $I_O$ to therefore give the height distribution H(r) of the object 5.

The distribution H(r) is generally given as a relatively grey scale height distribution image in which, for example, when the closest parts of the surface of the object 5 are white and the most distant parts of the surface of the object 5 are black the parts in between being various shades of grey.

To make various distances more apparent the image can be colour coded rather than merely presented as a grey scale in the same manner as is described in our co-pending International patent application number PCT/AU2005/000219, the contents of which are incorporated into this specification by this reference.

Thus, a clear image of the actual surface profile of the object is provided thereby enabling objects to be more easily identified and relative parts of the object with respect to one another determined.

Figure 5:
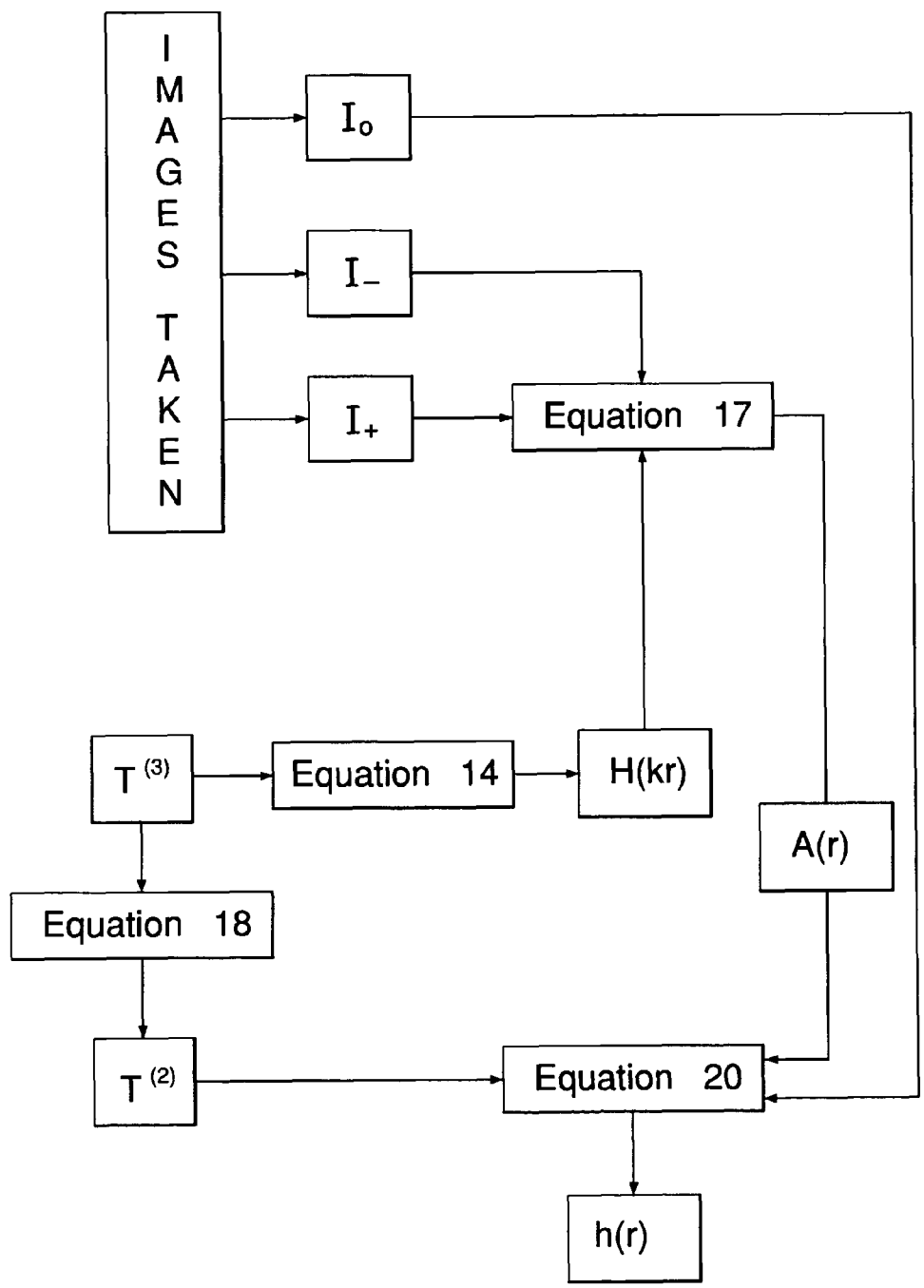

With reference to FIG. 5, the only images taken are images $I_-$, $I_+$ and $I_O$ using the cameras referred to above in accordance with either FIG. 2 or FIG. 3 and are stored as electronic data.

By solving equation 14, which is derived from the three dimensional optical transfer function, the processor 25 provides a height transfer function. An image equivalent to, or representing, an image taken inside the depth of field of the optical system ie A(r) is then determined by processor 25 using Equation 17. The inputs for equation (17) being images $I_-$, $I_+$, the height transfer function and $T^{(2)}$. $T^{(2)}$ is a known two dimensional transfer function derived from the three dimensional optical transfer function.

Finally, equation 20 is then used to determine h(r) with the inputs being $T^{(2)}$, H(r), A(r) and $I_O$ to therefore give the height distribution h(r) of the object 5.

At a practical level the main difference between the methodology in FIG. 4 and FIG. 5 is that FIG. 5 determines or generates a theoretical image inside the depth of field of the optical system, whereas FIG. 4 involves taking an actual image inside the depth of field.

Figure 6:
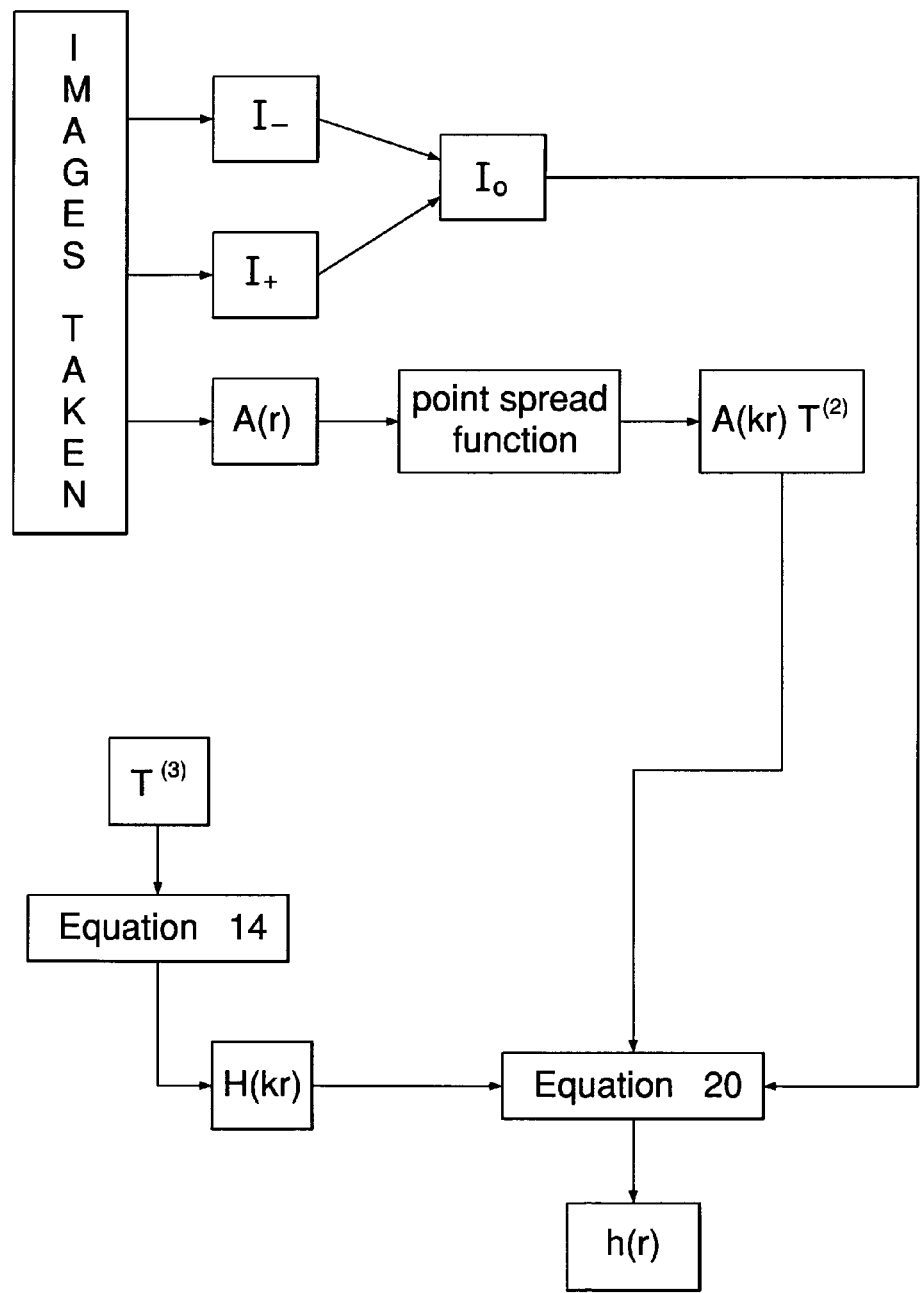

With reference to FIG. 6, the only images captured are image A(r) being an image inside the depth of field of the optical system, and images $I_-$ and $I_+$ being images that are the furthest and nearest from the object and outside the depth of field of the optical system. The image A(r) is then modified according to the point spread function using processor 25 to provide an image that represents an image outside the depth of field and represents the parameter $A(k_r)T^{(2)}$ in equation (20). The Point Spread Function is the image achieved of a point of light after light form the point source has traversed the optical system. The point spread function requires that the optical system be first calibrated in the form of measuring or knowing the distance between the object and a reference plane being one the planes of the images outside the depth of the field are captured.

The height transfer function $H(k_r)$ is also determined using processor 25 via equation (14). Finally, the height distribution of the object is determined using the processor 25 to solve equation (20). The inputs used in equation 20 being $I_o$, the height transfer function, the image inside the depth of the field and the point spread image $A(k_r) T^{(2)}$.

Figure 7:
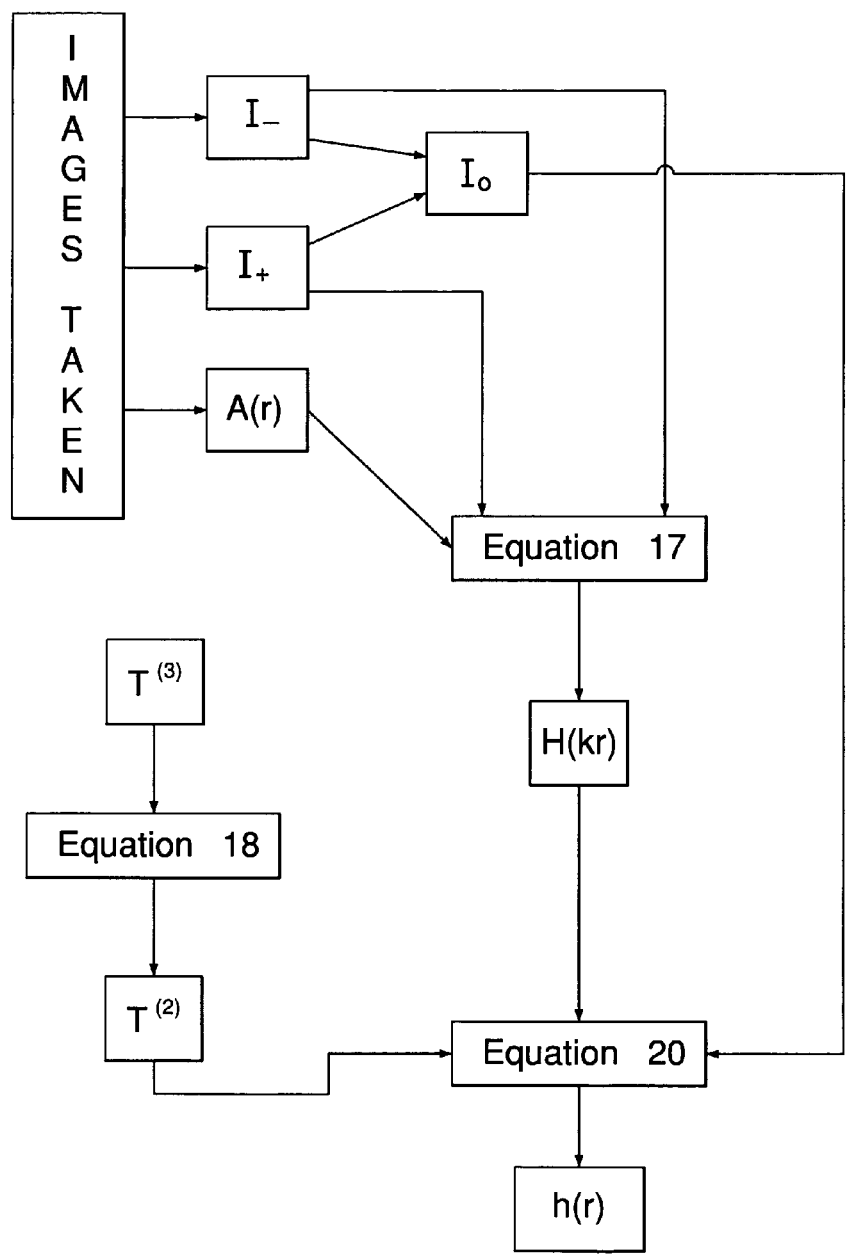

FIG. 7 is similar to the methodology shown in FIG. 4, save for one variation. Specifically, instead of capturing three images outside the depth of the field, it is also possible to capture only two images, and then average the images, for example, images $I_-$ and $I_+$ to determine or generate an input that represents an image intermediate images $I_-$ and $I_+$, namely image $I_0$. Once this has been achieved, the methodology is then a duplication of the methodology shown in FIG. 4.

Specifically, the data relating to the images $I_-$, $I_+$ and A(r) are used by the processor 25 to determine the height transfer function H using equation 17. As can be seen from equation 17 above the variables required to determine H(k_r) are A(r) and the two dimensional representations of the images I_+ and I_−.

Equation 20 is then used to determine h(r) with the inputs being $T^{(2)}$, H and $I_O$ to therefore give the height distribution H(r) of the object 5.

Figure 8:
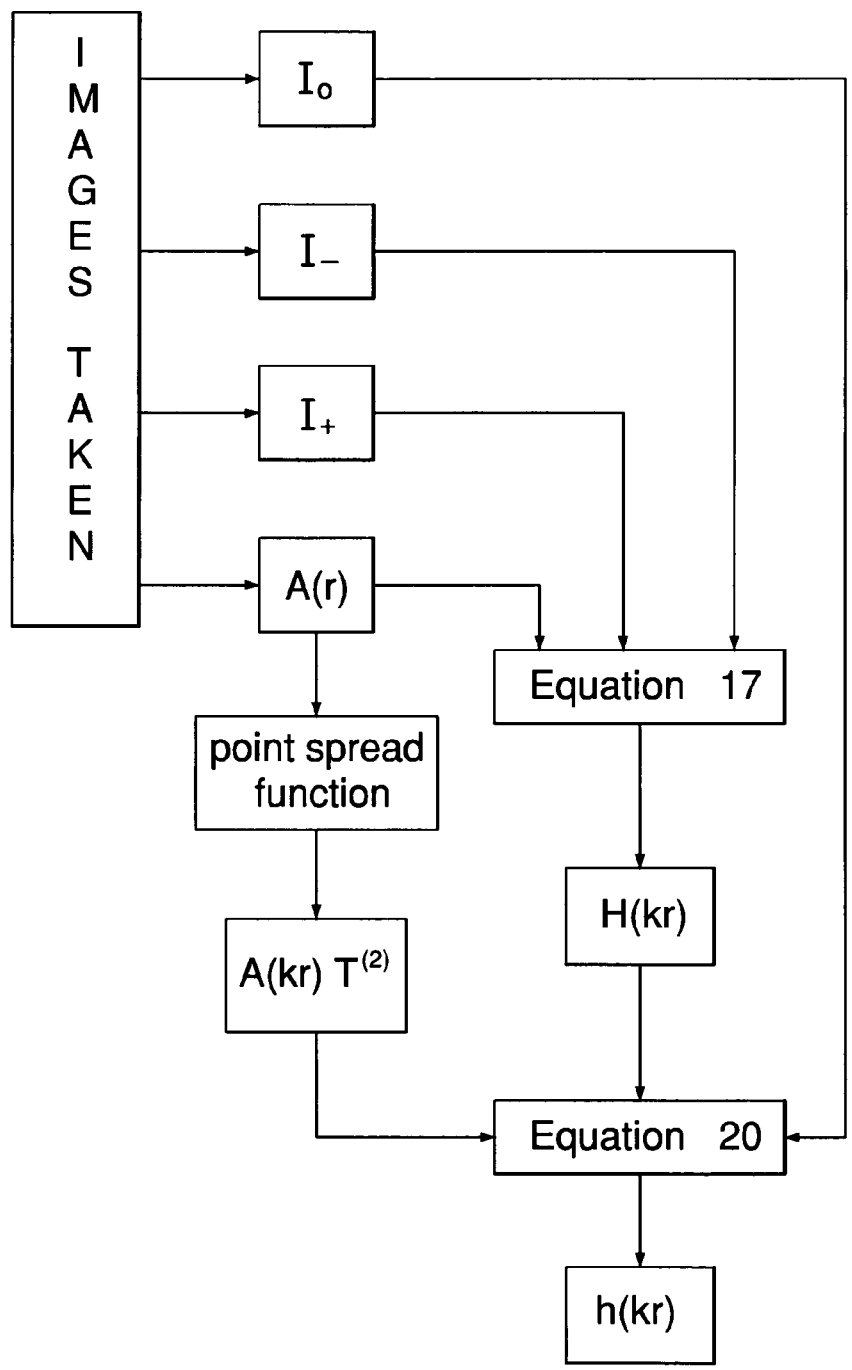

With reference to FIG. 8, images I_−, I_+ and A(r) are taken using the cameras referred to above in accordance with either FIG. 2 or FIG. 3 and are stored as electronic data.

The data relating to the images I_−, I_+ and A(r) are used by the processor 25 to determine the height transfer function H using equation 17. As can be seen from equation 17 above the variables required to determine H(k_r) are A(r) and the two dimensional representations of the images I_+ and I_−.

In addition, a point spread function is determined as described above whereby the image A(r) is defocused to generate an input equivalent to an image captured outside the depth of field of the optical system and represents the function $A(k_r)T^{(2)}$.

Equation 20 is then used by the processor 25 to determine h(r) with the inputs being $A(k_r)T^{(2)}$, H and $I_O$ to therefore give the height distribution H(r) of the object 5.

In the practice the methodology used of FIG. 8 is similar to the methodology of FIG. 4, except for a point spread function representation of $A(k_r)T^{(2)}$ being generated rather than the two dimensional transfer function being the basis of the input to solve equations 20.

Figure 9:
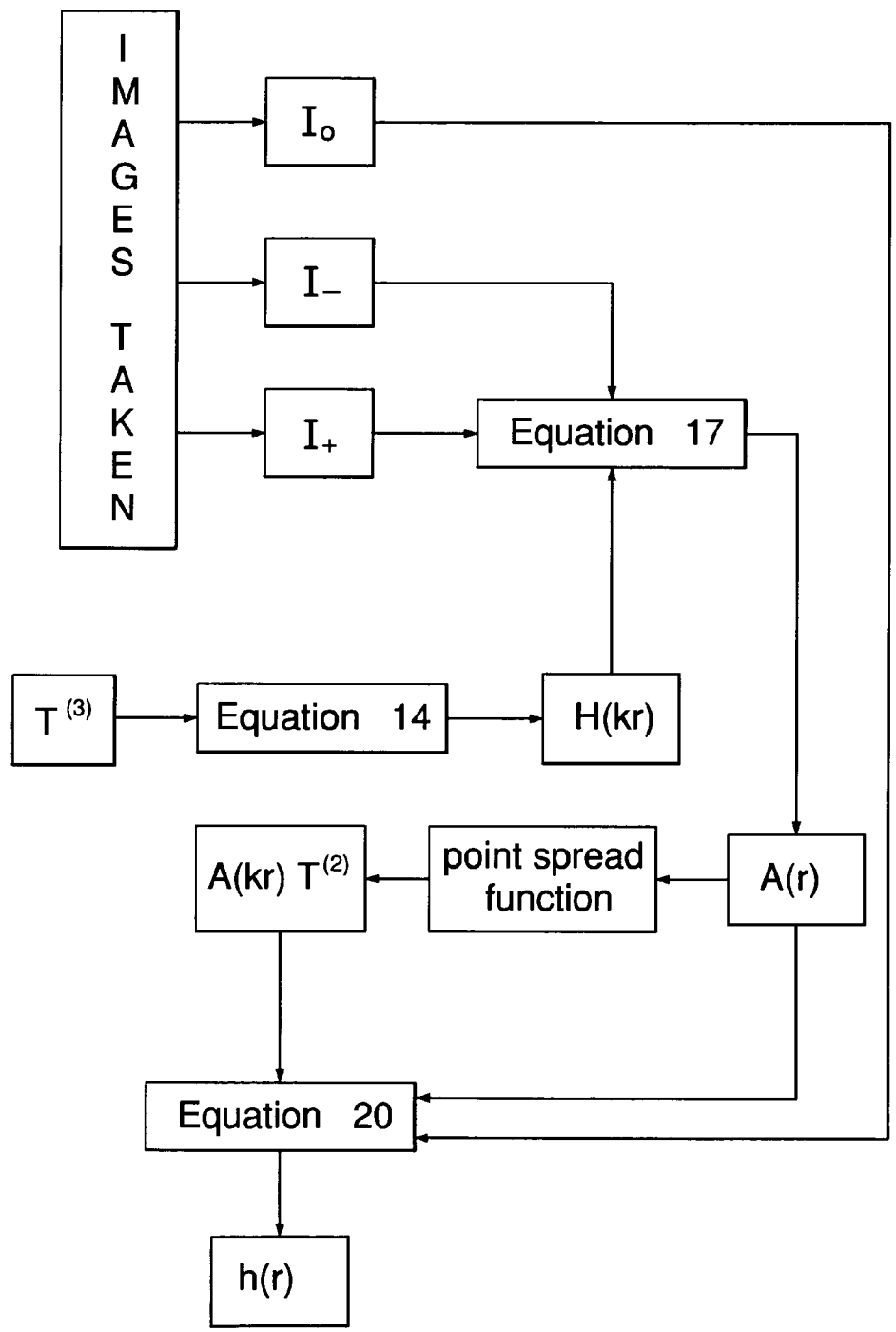

With reference to FIG. 9, the only images taken are images I_−, I_+ and $I_0$ using the cameras referred to above in accordance with either FIG. 2 or FIG. 3 and are stored as electronic data.

By solving equation 14, which is derived from the three dimensional optical transfer function, the processor 25 provides a height transfer function. Inputs in the form of I_−, I_+ and the height transfer function H(k_r) is then used to determine an image equivalent to, or representing, an image taken inside the depth of field of the optical system i.e. A(r). The Point Spread Function is then used to determine an input that represents an image of the object outside the depth of field of the optical system in the sense that it is light reflected from the object that has past through the optical system at a position outside the depth of field. In other words, the point spread function representation of $A(k_r)T^{(2)}$ as determined by a convolution of the point spread function and A(r) in processor 25. Finally, the inputs $A(k_r)T^{(2)}$, A(r) and $I_0$ are then used by processor 25 to solve equation 20 and provide the height distribution of the objection 5.

Figure 10:
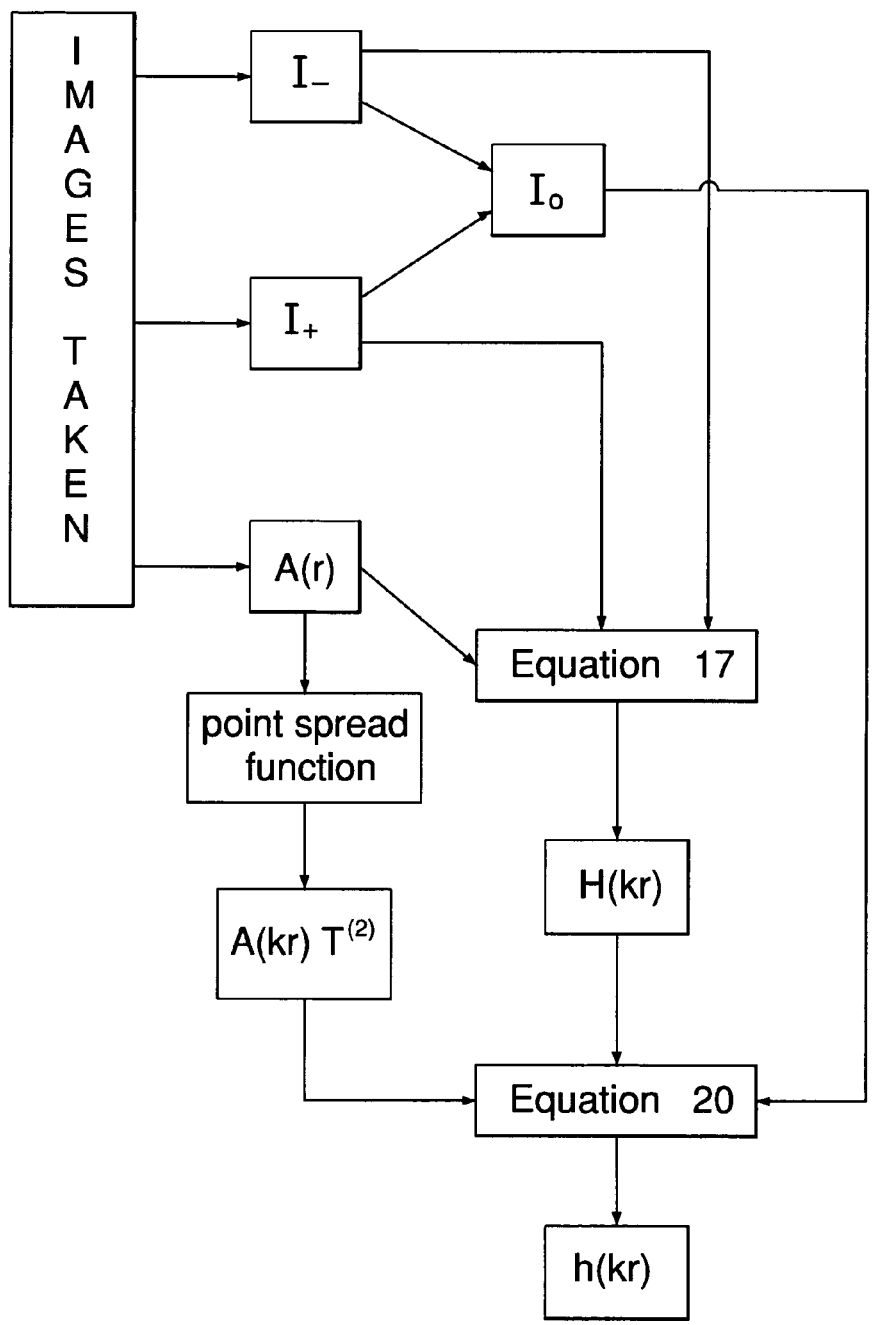

FIG. 10 illustrates a methodology in which only two images outside the depth of field of the optical system are taken, for example, images I_− and I_+ and the images are averaged to generate an input that represents an image intermediate images I_− and I_+, namely image $I_0$. An image inside the depth of field of the optical system is also taken, namely A(r). The three captured images are then processed using processor 25 using equation 17 to determine the height transfer function H(k_r).

In addition, a further input in the form of a blurred version of A(r) so as generate an input equivalent to an image outside the depth of field of the optical system so as to represent a point spread function blurred version of $A(k_r)T^{(2)}$. Inputs in the form of the height transfer function, the image generated from the image taken inside the depth of field of the optical system, namely $A(k_r)T^{(2)}$ and the average image $I_0$, are then used by the processor 25 to determine the height distribution H(r) of the object 5 according to equation 20.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method of determining the surface profile of a diffusely illuminated object, the method comprising:
   obtaining or determining three inputs that either are, or represent, three images of the object being at planes which are spaced from one another and outside the depth of field of an optical system capable of imaging the objects;
   obtaining or determining one further input that is, or represents, a light distribution image of the object within the depth of field of the optical system to provide a substantially focused image of the object;
   the three inputs that are, or represent, three images outside the depth of field providing height information of the surface of the object from a predetermined datum and the further input that is, or represents, the light distribution image from within the depth of field providing the light distribution from the surface of the object but no depth information; and
   processing the four inputs to determine a height distribution from the predetermined datum and therefore the surface profile of the object.

2. The method according to claim 1, wherein three inputs are obtained by taking images outside the depth of field of the optical system and the fourth input is determined or generated from the three inputs and is representative of an image inside the depth of field of the optical system.

3. The method according to claim 1, wherein two of the three inputs are obtained by taking images outside the depth of field of the optical system and the fourth input is obtained by taking an image inside the depth of field of the optical system, and the third input representative of an image taken outside the depth of the field of view of the optical system is determined from two or more of the inputs taken.

4. The method according to claim 1, wherein the processing of the four inputs comprises process data relating to the images using an optical transfer function and/or a height transfer function to determine the height distribution from the predetermined datum.

5. The method according to claim 1, wherein the method involves a) obtaining three images of the object by radiation reflected from the surface of the object, the three images being at planes which are spaced apart from one another and outside the depth of field of an optical system imaging the three images at the three planes; and b) generating or determining the further input by processing the three images outside the depth of the field so that the further input is in a form that represents the light distribution image.

6. The method according to claim 5, wherein the three images outside the depth of field comprises processing data relating to the images using an optical transfer function and/or a height transfer function to determine the height distribution from the predetermined datum.

7. The method according to claim 6, wherein the height transfer function is:

$$H(k_r) = -2i\int k_z \exp[-ik_z h_0] T^{(3)}(k_r, k_z) dk_z \quad (14)$$

which is derived from the three dimensional optical transfer function which is:

$$T^{(3)}(k_r, k_z) =$$

$$\frac{1}{2\pi k_r} \left\{ \begin{aligned} &\left[\frac{1}{2}k_{robj}^2(\xi^2+1) - \frac{1}{4}k_r^2 - \left(\frac{k_z}{\lambda k_r}\right)^2 - \left|\frac{k_z}{\lambda} - \frac{1}{2}k_{robj}^2(\xi^2-1)\right|\right]^{1/2} + \\ &\left[\frac{1}{2}k_{robj}^2(\xi^2+1) - \frac{1}{4}k_r^2 - \left(\frac{k_z}{\lambda k_r}\right)^2 - \left|\frac{k_z}{\lambda} + \frac{1}{2}k_{robj}^2(\xi^2-1)\right|\right]^{1/2} \end{aligned} \right\}$$

and wherein $k_r$ is radial lateral spatial frequency, the $k_z$ longitudinal spatial frequency and $\lambda$ is the radiation wavelength, and $\xi$ is the Numerical Aperture of the optical system $k_{robj}$ is the maximum spatial frequency accepted by the system.

8. The method according to claim 7, wherein the processing of the three images further comprises processing two of the three images and the height transfer function according to equation (14) to determine the amplitude distribution according to the following equation $$A(r) = \frac{1}{\varepsilon}\mathfrak{I}^{-1}\left\{\frac{I_+^{(2)}(k_r) - I_-^{(2)}(k_r)}{H(k_r)}\right\} \tag{17}$$

of which $I_-$ and $I_+$ are two of the three images at planes which are spaced apart from one another outside the depth of field and being the two images which are at a distance closest to the object and a distance furthest from the object, $H(k_r)$ is the height transfer function and $\epsilon$ is the distance of the planes at which the images $I_-$ and $I^+$ are taken from the plane at which the image $I_0$ is taken.

9. The method according to claim 8, wherein the height transfer function and the surface profile of the object is then solved according to $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\} \tag{20}$$

wherein $h(r)$ is the height distribution of the surface of the object from the predetermined datum, $I_-$, $I_0$, and $I_+$ are the three images outside the depth of field, $A(r)$ is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int\exp[-ik_z h_0]T^{(3)}(k_r,k_z)dk_z \tag{18},$$

$h_0$ is the distance from the predetermined datum to the plane at which the image $I_0$ is taken, $\epsilon$ is the distance of the planes at which the images $I_-$ and $I_+$ are taken from the plane at which the image $I_0$ is taken.

10. The method according to claim 1, wherein the method involves obtaining three images by radiation reflected from the surface of the object, the three images being at planes which are spaced apart from one another and outside the depth of field of an optical system aging the three images at the three planes.

11. The method according to claim 10, wherein the further input is in the form of a light distribution image of the object and the method involves obtaining the light distribution image by light reflected from the object within the depth of field of the optical system to provide a substantially focused image of the object.

12. The method according to claim 11, wherein the processing of the images comprises determining the height trans- fer function $H(k_r)$ by processing data relating to the images using a height transfer function which can be arranged as follows $$A(r) = \frac{1}{\varepsilon}\mathfrak{I}^{-1}\left\{\frac{I_+^{(2)}(k_r) - I_-^{(2)}(k_r)}{H(k_r)}\right\} \tag{17}$$

where $A(r)$ is the light distribution image within the depth of field, $k_r$ is the spatial frequencies (integration variables in Fourier space) in the radial direction and longitudinal direction respectively, $\epsilon$ is the distance of the planes at which the images $I_-$ and $I_+$ are taken from the plane at which the image $I_0$ is taken.

13. The method according to claim 12, wherein processing the four images to determine a height distribution and therefore the surface profile involves solving the following equation $$h(r) = \frac{2}{A(r)}\mathfrak{I}^{-1}\left\{\frac{\hat{I}_O(k_r) - \hat{A}(k_r)T^{(2)}(k_r)}{H(k_r)}\right\} \tag{20}$$

wherein $h(r)$ is the height distribution of the surface of the object from the predetermined datum, $I_-$, $I_0$, and $I_+$ are the three images outside the depth of field, $A(r)$ is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int\exp[-ik_z h_0]T^{(3)}(k_r,k_z)dk_z \tag{18},$$

$h_0$ is the distance from the predetermined datum to the plane at which the image $I_0$ is taken, $\epsilon$ is the distance of the planes at which the images $I_-$ and $I_+$ are taken from the plane at which the image $I_0$ is taken.

14. The method according to claim 1, wherein the method involves a) obtaining two of the three inputs in the from of actual images by radiation reflected from the surface of the object, the two images being at planes which are spaced apart from one another and outside the depth of field of an optical system imaging the two images and b) obtaining the further input in the form of a light distribution image by light reflected from the object within the depth of field of the optical system to provide a substantially focused image of the object and c) processing the two or three images to generate a third input that is a representation of the image of the object taken outside the depth of field of an optical system aging and at a plane that is spaced from the planes of the other two images outside the depth of field.

15. The method according to claim 14, wherein generating the third input is carried out by either i) averaging the input of the two of the three images obtained by radiation reflected from the surface of the object at planes outside the depth of field of an optical system imaging the two images or ii) using one of the two images as an approximate representation of the third input image.

16. The method according to claim 15, wherein the processing of the four inputs comprises process data relating to the images using an optical transfer function and/or a height transfer function to determine the height distribution from the predetermined datum.

17. The method according to claim 15, wherein the processing of the images comprises determining the height transfer function H($k_r$) by processing data relating to the images using a height transfer function which can be arranged as follows $$A(r) = \frac{1}{\varepsilon} \mathfrak{I}^{-1} \left\{ \frac{I_+^{(2)}(k_r) - I_-^{(2)}(k_r)}{H(k_r)} \right\} \quad (17)$$

where A(r) is the light distribution image within the depth of field, $k_r$ is the spatial frequencies (integration variables in Fourier space) in the radial direction and longitudinal direction respectively, ϵ is the distance of the planes at which the images $I_-$ and $I_+$ are taken from the plane at which the image $I_0$ is taken.

18. The method according to claim 17, wherein processing the four images to determine a height distribution and therefore the surface profile involves solving the following equation $$h(r) = \frac{2}{A(r)} \mathfrak{I}^{-1} \left\{ \frac{\hat{I}_O(k_r) - \hat{A}(k_r) T^{(2)}(k_r)}{H(k_r)} \right\} \quad (20)$$

wherein h(r) is the height distribution of the surface of the object from the predetermined datum, $I_-$, $I_0$, and $I_+$ are the three images outside the depth of field, A(r) is the light distribution image within the depth of field, $k_r$ and $k_z$ are the spatial frequencies (integration variables in Fourier space) in the radial direction and longitudinal direction respectively, $T^{(2)}$ is the two dimensional optical transfer function $$T^{(2)}(k_r) = \int \exp[-ik_z h_0] T^{(3)}(k_r, k_z) dk_z \quad (18),$$

$h_0$ is the distance from the predetermined datum to the plane at which the image $I_0$ is taken, ϵ is the distance of the planes at which the images $I_-$ and $I_+$ are taken from the plane at which the image $I_0$ is taken.

19. The method according to claim 14, wherein the method involves generating an input that represents an image outside the depth of field of the optical system which is a product of the light distribution image within the depth of field and the two dimensional transfer function that is determined experimentally via a pinot spread function.

20. The method according to claim 19, wherein experimentally determining the height transfer function involves calibrating the optical system by measuring the distance from the plane at which the image is taken and the predetermined datum by setting one of the images outside the depth of field of the optical system imaging the images as a plane of reference.

21. The method according to claim 20, wherein the processing the images to determine the height distribution from the predetermined datum is then the difference between the image at the plane of reference outside the depth of field and the third image generated from the in focus image once normalized by the image obtained in the depth of field of the optical system and calibrated according to the height transfer function.

22. The method according to claim 19, wherein the input outside the depth of field of the optical system is represented by the term $\hat{A}(k_r) T^{(2)}(k_r)$ of the equation $$h(r) = \frac{2}{A(r)} \mathfrak{I}^{-1} \left\{ \frac{\hat{I}_O(k_r) - \hat{A}(k_r) T^{(2)}(k_r)}{H(k_r)} \right\}. \quad (20)$$

23. The method according to claim 19, wherein the height distribution and therefore the surface profile of the object to be determined according to the equation $$h(r) = \frac{2}{A(r)} \mathfrak{I}^{-1} \left\{ \frac{\hat{I}_O(k_r) - \hat{A}(k_r) T^{(2)}(k_r)}{H(k_r)} \right\} \quad (20)$$

wherein h(r) is the height distribution of the surface of the object, $I_0$ is one of the two images outside the depth of field, A(r) is the light distribution image within the depth of field, $k_r$ is the spatial frequencies (integration variables in Fourier space) in the radial direction and longitudinal direction respectively, $T^{(2)}$ is the two dimensional optical transfer function and $A(k_r) T^{(2)}$ is the product that represents the third image outside the depth of field of the optical system.

24. The method according to claim 9, wherein instead of using the two dimension optical transfer function $T^{(2)}$ to solve equation (20), the method involves applying a point spread function to the image obtained or determined to be an image inside the depth of field of the optical system which represents the term $\hat{A}(k_r) T^{(2)}(k_r)$ and determining the height distribution of the object via equation (20).

25. The method according to claim 1, wherein three cameras are used to capture the images with one of the three cameras also capturing the light distribution image within the depth of field.

26. The method according to claim 1, wherein the method includes supplying the light to the cameras by an optical system comprising at least a lens and an iris.

27. The method according to claim 26, wherein the three images outside the depth of field of the optical system are captured using an optical system providing a high numerical aperture and low depth of field and the light distribution image within the depth of field is provided by altering the iris to provide a low numerical aperture and a high depth of field.

28. An apparatus for determining the surface profile of a diffusely illuminated object comprising:
   a processor for:
   i) obtaining or determining three inputs that either are, or represent, three images of the object being at planes which are spaced from one another and outside the depth of field of an optical system capable of imaging the objects;
   ii) obtaining or determining one further input that is, or represents, a light distribution image of the object within the depth of field of the optical system to provide a substantially focused image of the object;
   iii) the three inputs that are, or represent, three images outside the depth of field providing height information of the surface of the object from a predetermined datum and the further input that is, or represents, the light distribution image from within the depth of field providing the light distribution from the surface of the object but no depth information; and
   iv) processing the four inputs to determine a height distribution from the predetermined datum and therefore the surface profile of the object.

29. The apparatus according to claim 28, wherein the apparatus further comprises one or more CCD cameras for capturing the images.

30. The apparatus according to claim 28, wherein three cameras are used to capture the images with one of the three cameras also capturing the light distribution image within the depth of field.

31. The apparatus according to claim 28, wherein the apparatus further comprises an optical system comprising at least a lens and an iris.

32. An apparatus for determining the surface profile of an object comprising a processor for carrying out the method according to claim 1.

33. A non-transitory computer-readable medium comprising:
a computer program for determining the surface profile of an object using three inputs that either are, or represent, three images of the object being at planes which are spaced from one another and outside the depth of field of an optical system capable of imaging the objects and one further input that is, or represents, a light distribution image of the object within the depth of field of the optical system to provide a substantially focused image of the object, the three inputs that are, or represent, three images outside the depth of field providing height information of the surface of the object from a predetermined datum and the further input that is, or represents, the light distribution image from within the depth of field providing the light distribution from the surface of the object but no depth information;
wherein the computer program comprises code for processing the four inputs to determine a height distribution from the predetermined datum and therefore the surface profile of the object.

34. The non-transitory computer-readable medium according to claim 33, wherein the computer program further comprises code for processing data relating to the images using an optical transfer function and/or a height transfer function to determine the height distribution from the predetermined datum.

35. A non-transitory computer-readable medium, a computer program comprising code for processing data according to the method of claim 1.

* * * * *